US011544026B1

(12) United States Patent
Morales

(10) Patent No.: US 11,544,026 B1
(45) Date of Patent: Jan. 3, 2023

(54) PRINTING SYSTEM AND METHODS FOR MANAGING OUTPUT FOR PRINT JOBS HAVING DOCUMENT COMPONENTS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/476,938

(22) Filed: Sep. 16, 2021

(51) Int. Cl.
   *G06F 3/12* (2006.01)

(52) U.S. Cl.
   CPC .......... *G06F 3/1264* (2013.01); *G06F 3/1204* (2013.01); *G06F 3/1262* (2013.01)

(58) Field of Classification Search
   None
   See application file for complete search history.

(56) References Cited

U.S. PATENT DOCUMENTS

| 7,758,036 | B2 | 7/2010 | Levine et al. |
| 8,696,287 | B2 | 4/2014 | Sturnick et al. |
| 2008/0138170 | A1* | 6/2008 | Sturnick ................. B42C 19/02 412/4 |
| 2008/0273945 | A1* | 11/2008 | Levine .................... B42C 11/02 412/4 |
| 2015/0363150 | A1* | 12/2015 | Gaertner ............... G06F 3/1282 358/1.15 |

* cited by examiner

*Primary Examiner* — Frantz Bataille
(74) *Attorney, Agent, or Firm* — Millen, White, Zelano & Branigan, P.C.; William Nixon

(57) ABSTRACT

A printing system includes a printing device having a digital front end (DFE) and at least one client device that sends print jobs to the printing device. A print job may include different components needed to completely print a document, such as a cover and block of pages for a book. The DFE identifies the different components within the print job and provides tight integration to coordinate the printing of the different components. Rules are used to identify the different components. Once identified, the DFE can route the components accordingly to different output bins or different printing devices as well as provide separate print instructions for the components. Rules also are used to define job batching within the printing devices.

17 Claims, 10 Drawing Sheets

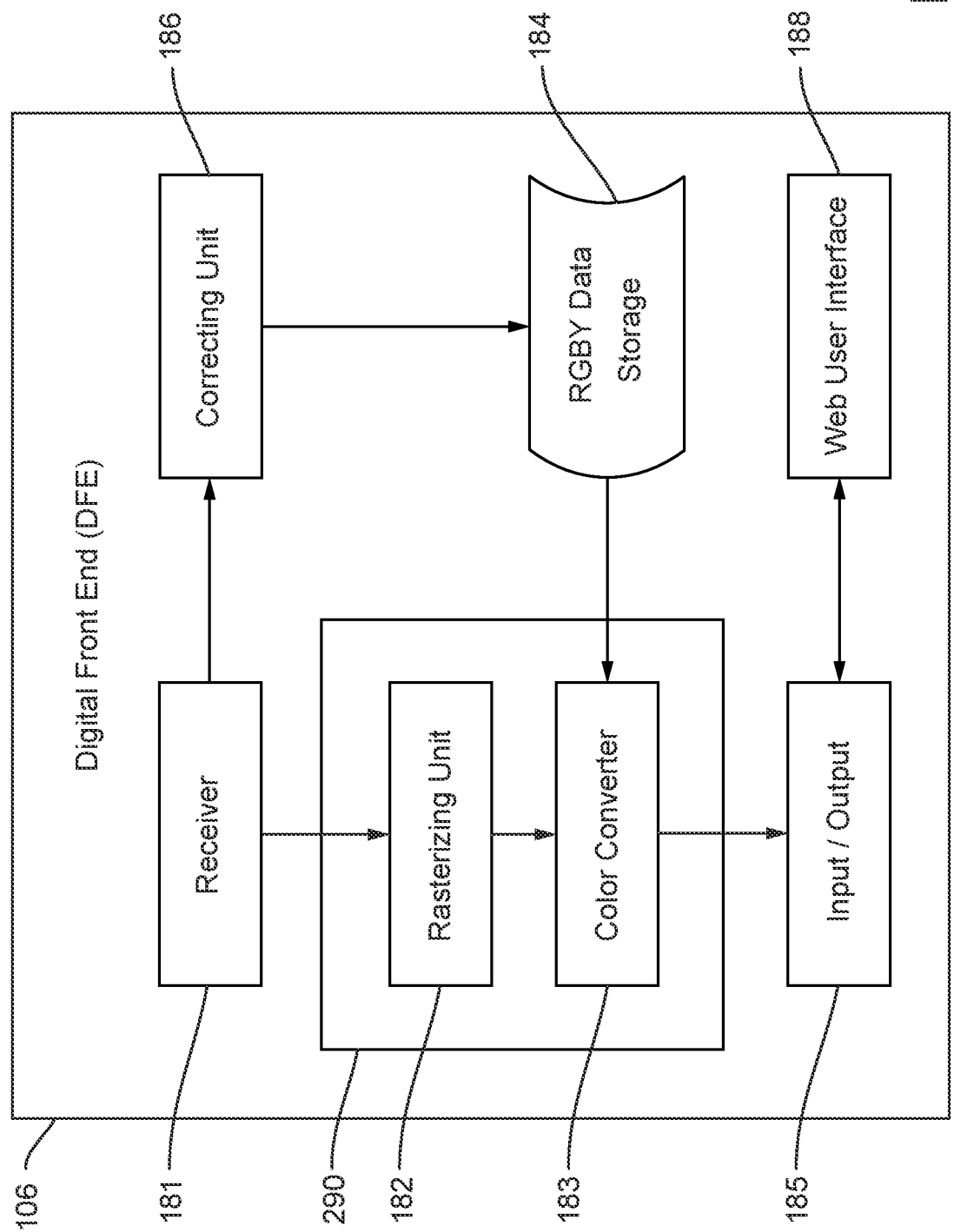

PRINTING SYSTEM AND METHODS FOR MANAGING OUTPUT FOR PRINT JOBS HAVING DOCUMENT COMPONENTS

FIELD OF THE INVENTION

The present invention relates to processing print jobs having a plurality of document components, such as a cover and pages. More particularly, the present invention relates to the management of the output of the print jobs at the printing device or amongst a plurality of printing devices.

DESCRIPTION OF THE RELATED ART

Production of multi-component print jobs, such as books, may be challenging because these operations require coordination of the production of multiple components that must be assembled to produce the final product. Books may be bound by instructions that involve assembly of book covers and blocks of pages during finishing. These two components are produced using two separate processes. Page, or book, blocks are printed and optionally glued (temporarily), folded, and sewn before they are assembled with the covers. Book covers are printed and optionally embellished, laminated, and pre-trimmed (if laminated) before they are assembled with the book blocks.

While complex, the logistics for conventional printing revolve around tracking a few components through production to ensure that all required components are available in the required quantities when it is time to assemble the books. For on-demand book printing, the logistical challenges may be greater. Because print quantities for on-demand printing are typically between 1 and 2 copies, print jobs should be produced in batches that track every single component for every single copy of the entire production print run. Although there are validation systems in the market that ensure that the correct cover and block are bound together, this feature is less than ideal as they catch an error after it happens. Similarly, production coordination systems that manage this sort of production are typically inflexible and require significant development in order to implement.

SUMMARY OF THE INVENTION

A method for printing a batch of print jobs is disclosed. The method includes selecting a first output bin at a printing device. The first output bin has a first capacity to print a first component of the print jobs. The method also includes selecting a second output bin at the printing device. The second output bin has a second capacity to print a second component of the print job. The second capacity differs from the first capacity of the first output bin. The method also includes determining a number of print jobs of the batch of print jobs based on a combined capacity that the first capacity of the first output bin and the second capacity of the second output bin can accommodate. The method also includes separating the first components from the second components of the number of print jobs. The method also includes creating a first production group for the first component to be sent to the first output bin. The method also includes creating a second production group for the second component to be sent to the second output bin. The method also includes printing the first production group to the first output bin and the second production group to the second output bin.

A method for printing a batch of print jobs within a system of printing devices. The method includes selecting a first printing device within the system of printing devices. The first printing device has a first capacity to print a first component of the print jobs. The method also includes selecting a second printing device within the system of printing devices. The second printing device has a second capacity to print a second component of the print job. The second capacity differs from the first capacity of the first printing device. The method also includes determining a number of print jobs of the batch of print jobs based on a combined capacity that the first capacity of the first printing device and the second capacity of the second printing device can accommodate. The method also includes separating the first components from the second components of the number of print jobs. The method also includes creating a first production group for the first component to be printed according to a first set of production instructions. The method also includes creating a second production group for the second component to be printed according to the second set of production instructions. The method also includes sending the first production group to the first printing device and the second production group to the second printing device.

A printing device is disclosed. The printing device includes a first output bin having a first capacity. The printing device also includes a second output bin having a second capacity that differs from the first capacity. The printing device also includes a digital front end (DFE) having a job queue for a batch of print jobs. The DFE sends print jobs to the first output bin and the second output bin. The DFE includes a processor that configures the DFE to select the first output bin to print a first component of the print jobs. The processor also configures the DFE to select the second output bin to print a second component of the print job. The processor also configures the DFE to determine a number of print jobs of the batch of print jobs based on a combined capacity that the first capacity of the first output bin and the second capacity of the second output bin can accommodate. The processor also configures the DFE to separate the first components from the second components of the number of print jobs. The processor also configures the DFE to create a first production group for the first component to be sent to the first output bin. The processor also configures the DFE to create a second production group for the second component to be sent to the second output bin. The processor also configures the DFE to send the first production group to the first output bin and the second production group to the second output bin.

BRIEF DESCRIPTION OF THE DRAWINGS

Various other features and attendant advantages of the present invention will be more fully appreciated when considered in conjunction with the accompanying drawings.

FIG. 1B illustrates a block diagram of an embedded digital front end for the printing device according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments relate to a system and associated methods in which tight integration between the printing device and the management systems enables a more flexible system that can be implemented and modified easily. The disclosed embodiments optimize book printing by coordinating the printing of book, or document, components based on device capabilities. The digital front end (DFE) of a printing device is configured with rules that may be used to help identify multi-component print jobs, such as books, and the expected production sequence.

The disclosed embodiments optimize book, or multi-component, print job production without requiring press operators to batch or sequence jobs or their components. This feature may free up operators to spend their time on other production tasks. This feature also may reduce production errors because software-produced consistent output is provided a consistent input. In addition, post-print processes are streamlined by preparing print jobs in a more consistent manner.

Figure 1A:
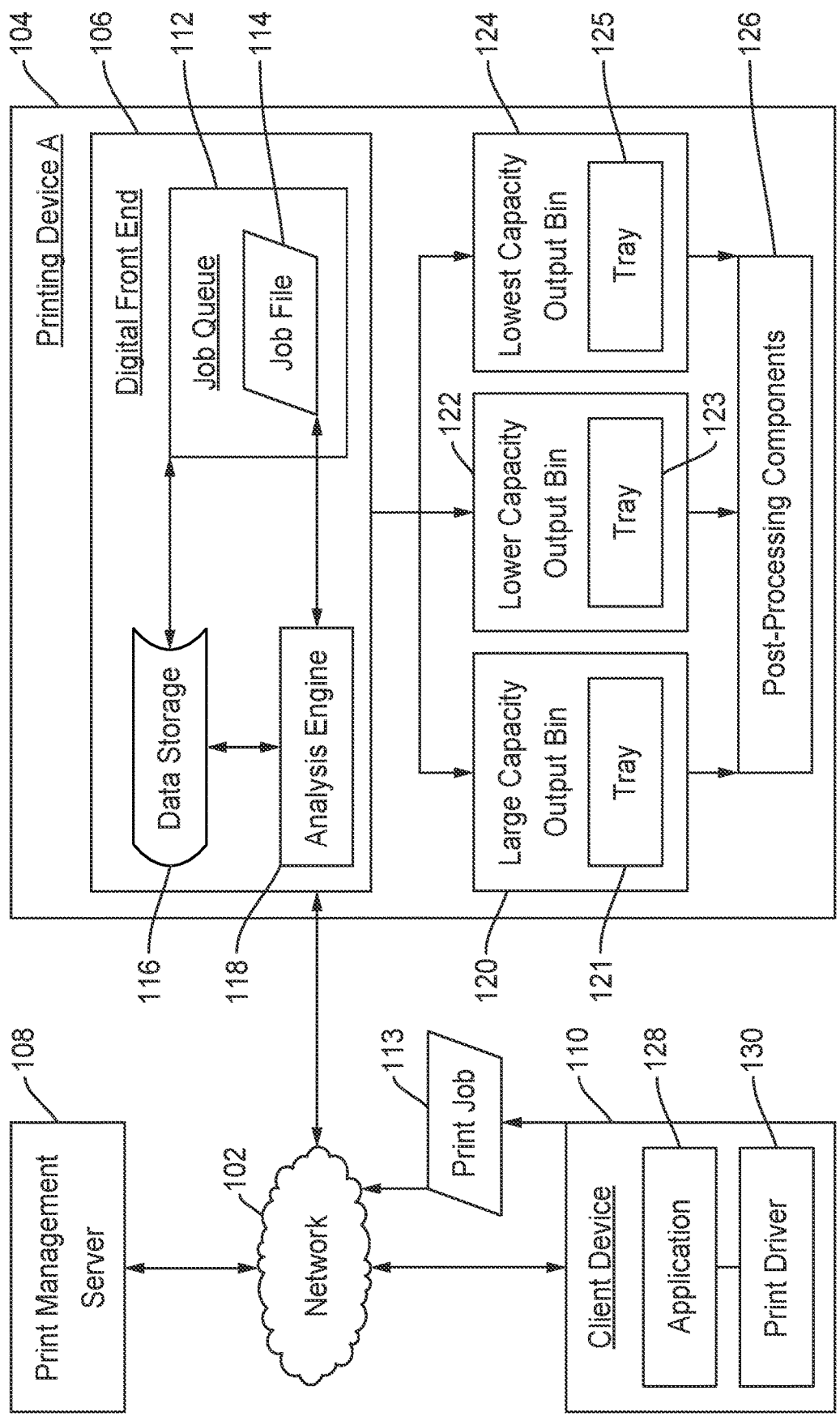
FIG. 1A illustrates a block diagram of a printing system having a printing device connected to client devices according to the disclosed embodiments.

FIG. 1A depicts a printing system 100 having a printing device 104 for printing multi-component print jobs according to the disclosed embodiments. Printing system 100 may be located in a print shop or other environment suitable for production printing operations. Printing system 100 includes one or more printing devices 104 that receive print jobs from client devices 110. Further, printing operations may be managed by print management server 108. As shown in FIG. 1A, print job 113 is submitted from client device 110 to printing device 104, but it also may be submitted to print management server 108 which selects printing device 104 to complete the job.

Possible configurations of printing system 100 may implement rules that consider the first page or first two pages of any file as the book cover. Printing system 100 may look at the dimensions of the first two pages of a print job and consider these pages to be cover pages if their dimensions differ from the dimensions used for the rest of the pages. Printing system 100 also may look at the print instructions and metadata identifying pages as either cover or block pages. Printing system 100 also may look at separate but correlated print jobs for similar information.

In addition to the above, printing system 100 should also be configured with the required print sequence and face orientation for each component. For example, a book cover may go through the following steps: print, lamination, trimming, and perfect binding with the book block. A book, or page, block may go through printing, folding, and perfect binding with the cover. For example, if the block printing and folding are done inline by post-processing components 126 of printing device 104, then print job 113 includes instructions to print 1-n, face down, which would result with downward facing blocks stacked from the first to the last. In order for the covers to have a matching sequence, they should be printed in a n to 1 direction because the lamination will reverse the sequence and the trimming (if using a guillotine) will not. If the trimming uses a sheet-fed cutter, then the covers should be printed in a 1 to n direction that will become n to 1 after lamination (which is sheet fed) and 1 to n after sheet-fed trimming. In any event, DFE 106 or print management server 108 should include a list of post-print processes that will be configured to have a specific effect on the printed stack. This effect may be reversing the print order or tumbling so that a face up orientation becomes a face down orientation.

When print jobs are submitted to DFE 106 of printing device 104, the production instructions may include both the print instructions as well as the finishing instructions. In addition, DFE 106 is also configured with rules that define job batching. When print jobs are received by printing device 104, it will aggregate them until the criteria in the batching rules are met. Batching criteria may include waiting until a certain number of impressions or books have been aggregated. Batching rules also may include options for releasing job files 114 from job queue 112 of DFE 106 after a specified amount of time. Further, batches should have production commonality so that print jobs with covers that require lamination are not batched with covers that do not require lamination.

Once DFE 106 determines that a batch of books should be released, it will sub-divide the batches into production groups based on the batching criteria, rules, or output capacity. Printing system 100 may select two output bins 120 and 122 at printing device 104 to complete the print job. Output bin 120 may be a large capacity output bin and output bin 122 may be a lower capacity output bin. For example, printing device 104 may include a main tray in a high capacity stacker with a 5000 sheet capacity as output bin 120. It also may include a top tray with a 500 sheet capacity in the stacker as output bin 122. Alternatively, printing device 104 may include output bin 120 as a tray with a 4000 sheet capacity and output bin 122 as a tray with a 500 sheet capacity.

Printing system 100 will determine the number of print jobs that the combined capacity of output bins 120, 122, and 124 will accommodate. Once the number of print jobs is determined, printing system 100 will separate the covers and the page blocks into their own sub-production groups. The job sequence within these production sub-groups and the print direction (1-n/n-1) as well as the face orientation (face up/face down) will be based on the required post-print processing for the print jobs Once the production groups and their sub-production groups have been created, printing system 100 will print them to the selected output bins 120, 122, or 124 of printing device 104. If the print jobs and components are separate, then printing system 100 will adjust the sequence of printing. If the print jobs are separate but the components are in the same file, printing system 100 will print subsets of the job file to different output bins. If the print jobs are all in one combined file, then printing system 100 will print subsets for each book in the file to different output bins. The print sequence may be done on either a book-by-book basis, which has the most fidelity. Alternatively, printing system 100 may print all blocks first and then print all covers in order to optimize productivity.

Once the output bins reach their combined capacity, printing system 100 will pause production until trays are unloaded or the printing system will switch to another set of trays. Capacity may be reached when either the high capacity or the low capacity tray cannot accommodate another file or copy of a file in its entirety. This process may repeat until all production groups in the batch have been printed. If additional jobs appear while a batch is printing, printing system 100 may add them to the batch as a separate sub-group.

In any case, each production group represents a matching and contiguous set of job components that will be in a matched sequence once the components have gone through their individual post-print processes. The matched sequence will ensure that all components are in the expected sequence so that individual components can be bound together. The production grouping will ensure that each time printed documents are removed from printing device 104, they contain a contiguous set of books that can be finished without dependencies on output from previous or subsequent batches.

In addition to the single printing device configuration disclosed above, printing system 100 also may be configured to work with multiple printing devices. A printing device may be used for each component. Further, printing system 100 also may be configured to operate with multiple high capacity output bins, in either a single or multiple printing devices. In this instance, printing system 100 would automatically add a divider to demarcate the production group boundaries for high capacity trays that are receiving covers or other components with low print volumes.

Referring back to FIG. 1A, other features are disclosed within printing system 100. Client device 110 may be capable of executing applications and programs 128 to generate documents and files, such as, for example, a computer, a laptop computer, mobile device or tablet, smart phone, kiosk, and the like. Client device 110 may send print jobs to printing device 104 over one or more networks 102 implemented within printing system 100 using print driver 130. Print driver 130 converts the data generated or created by application 128 into a format that printing device 104 can understand. The result is print job 113. Additional client devices may be connected to printing device 104, which submit print jobs to printing device 104 or print management server 108.

Network 102 may be used by system 100 to exchange data between the devices within system 100. The devices are configured to communicate with network 102 over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.), or a wireless IP protocol (e.g., IEEE 802.11 family) Alternatively, network 102 may be a local area network, wide area network, an ad-hoc network. Network 102 allows printing device 104 and client device 110 to exchange data using the appropriate protocol.

Printing device 104 is disclosed in greater detail below. It includes embedded digital front end (DFE) 106, or a printing device controller, that is the workflow touchpoint which accepts a print job, or print file, commonly a PDF or PostScript file. DFE 106 converts the file of the print job into a format that print engine 260, disclosed below, can use to lay down the content of the document corresponding to the print job on a media. DFE 106 may include a raster image processor (RIP) as well as other components.

FIG. 1B depicts a block diagram of DFE 106 according to the disclosed embodiments. DFE 106 includes a receiver 181, an RIP firmware 290 including rasterizing unit 182 and a color converter 183, an RGBY data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also includes job queue 112, data storage 116, and analysis engine 118, even though these are not shown in FIG. 1B.

Receiver 181 receives a print job generated by client device 110 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) stored in RGBY data storage 184. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with client device 110 and print management server 108 using, for example, input/output connector 185. Web user interface 188, or web application, allows a user of client device 110 or print management server 108 to interact with content or software running on DFE 106.

Referring back to FIG. 1A, DFE 106 also includes job queue 112, data storage 116, and analysis engine 118. Print job 113 may be received at DFE 106 and passed to analysis engine 118 to analyze the data and metadata associated with the print job to determine how to treat the processing. Analysis engine 118 is disclosed in greater detail below. Once print job 113 is analyzed and the component therein identified, it is placed in job queue 112 as job file 114.

Job queue 112 may include several print jobs received for processing as disclosed above. The ready to print file in job queue 112 for print job 113 is shown as job file 114. Job queue 112 may place the print jobs in an order for printing on printing device 104. DFE 106 also includes data storage 116 that stores various files, such as instructions used to enable analysis engine 118 and job files of print jobs that are not ready for printing yet.

Part of the function of analysis engine 118 is to determine whether components of print job 113 can be routed to different output bins of printing device 104. In other embodiments, it may be determined that components of print job 113 be routed to different printing devices having separate capabilities. Once the components are identified, different output bins may be used to print using different papers or media as well as the capacity of the respective bin. Thus, printing device 104 includes output bins 120, 122, and 124. Print job 113 may require output bin 120 and output bin 122. Output bin 120 may be a large capacity output bin while output bin 122 may be a lower capacity output bin. Thus, components within print job 113 having many pages, such as a block for the book, may be routed to output bin 120. Component not having many pages, such as a cover, that also require a certain type of media may be routed to output bin 122. Output bin 124 also may be used, as disclosed below. Output bin 120 includes tray 121, output bin 122 includes tray 123, and output bin 124 includes tray 125.

After being printed out, the different components may be provided to post-processing components 126 of printing device 104. Components 126 may bind the components within the output bins into finished products, such as the books of print job 113. DFE 106 includes a list of post-print processes that are configured to have a specific effect on the printed components. Such effects may include lamination and trimming. The finishing instructions may be submitted with print job 113.

Figure 1C:
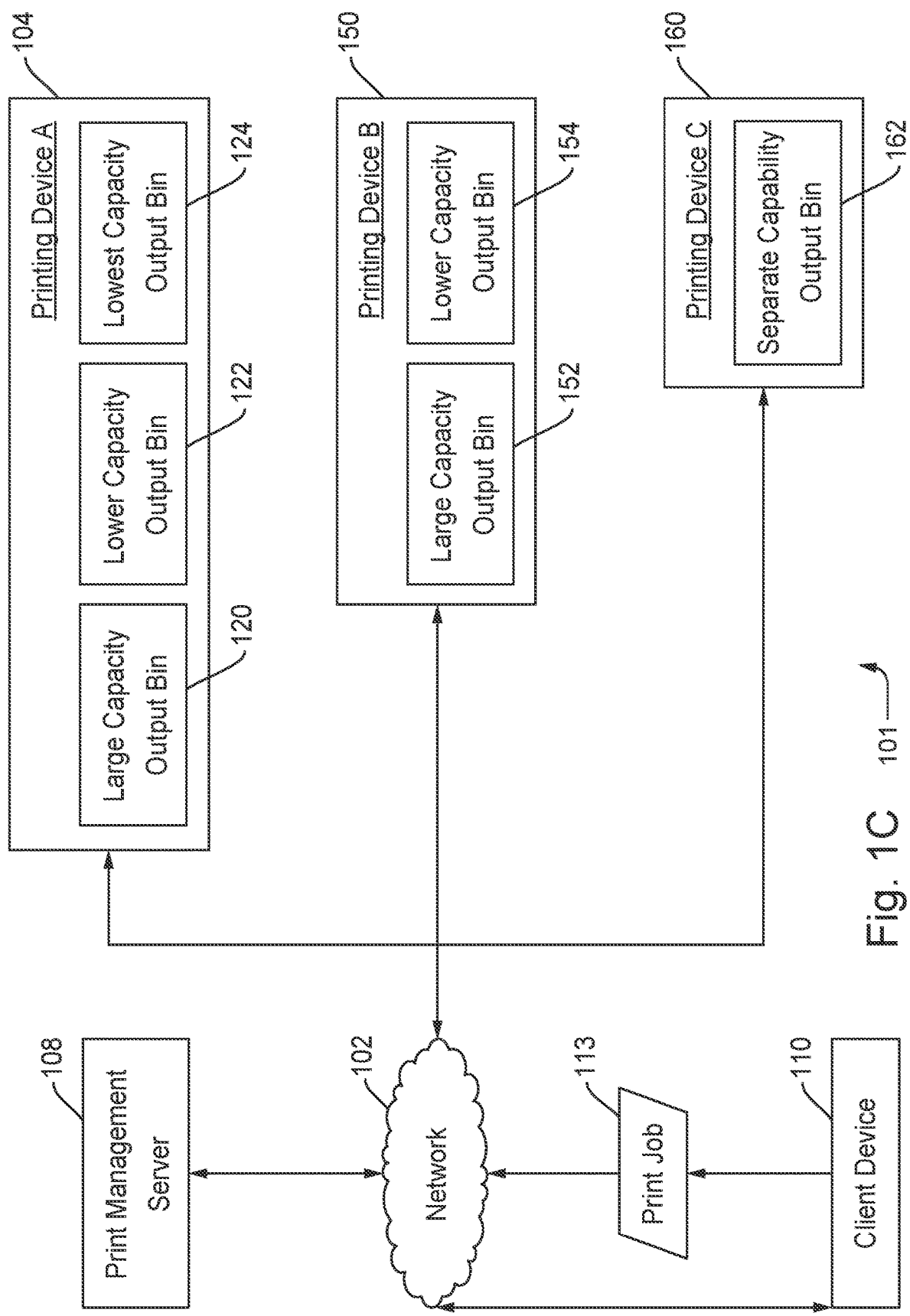
FIG. 1C illustrates a printing system having a plurality of printing devices according to the disclosed embodiments.

FIG. 1C depicts printing system 101 having a plurality of printing devices according to the disclosed embodiments. Printing system 101 includes the features disclosed above but shows a plurality of printing devices being used for printing operations. Instead of a single printing device handling the management of printing operations, a plurality of printing devices may be used. Printing devices 150 and 160 are shown but printing system 101 may include additional printing devices as needed.

Print job 113 may still be received at printing device 104 or print management server 108. Print job 113 is analyzed according to the disclosed embodiments to determine the different components of the print job, such as a book block and a cover. Other components may be identified as well, such as glossy paper for appendices or maps within the book. An insert on stiff media may be used. After analysis engine 118 determines the different components, it may route separate components to different printing devices based on criteria.

For example, printing device 150 may include output bins 152 and 154 while printing device 160 includes output bin 162. When printing device 104 reaches its combined capacity, printing operations may be continued at printing device 150. For example, output bin 152 may have the same parameters and capabilities as output bin 120. Output bin 154 may be the same as output bin 122. Thus, printing operations are not interrupted.

In other embodiments, the different printing devices may have separate capabilities. For example, printing device 160 includes output bin 162, which may include media to print glossy paper or one having unusual dimensions. Analysis engine 118 within DFE 106 may determine that a component of print job 113 should be processed and printed using output bin 162. Thus, it will be routed to output bin 162 while the other components may be printed at printing device 104.

Figure 2:
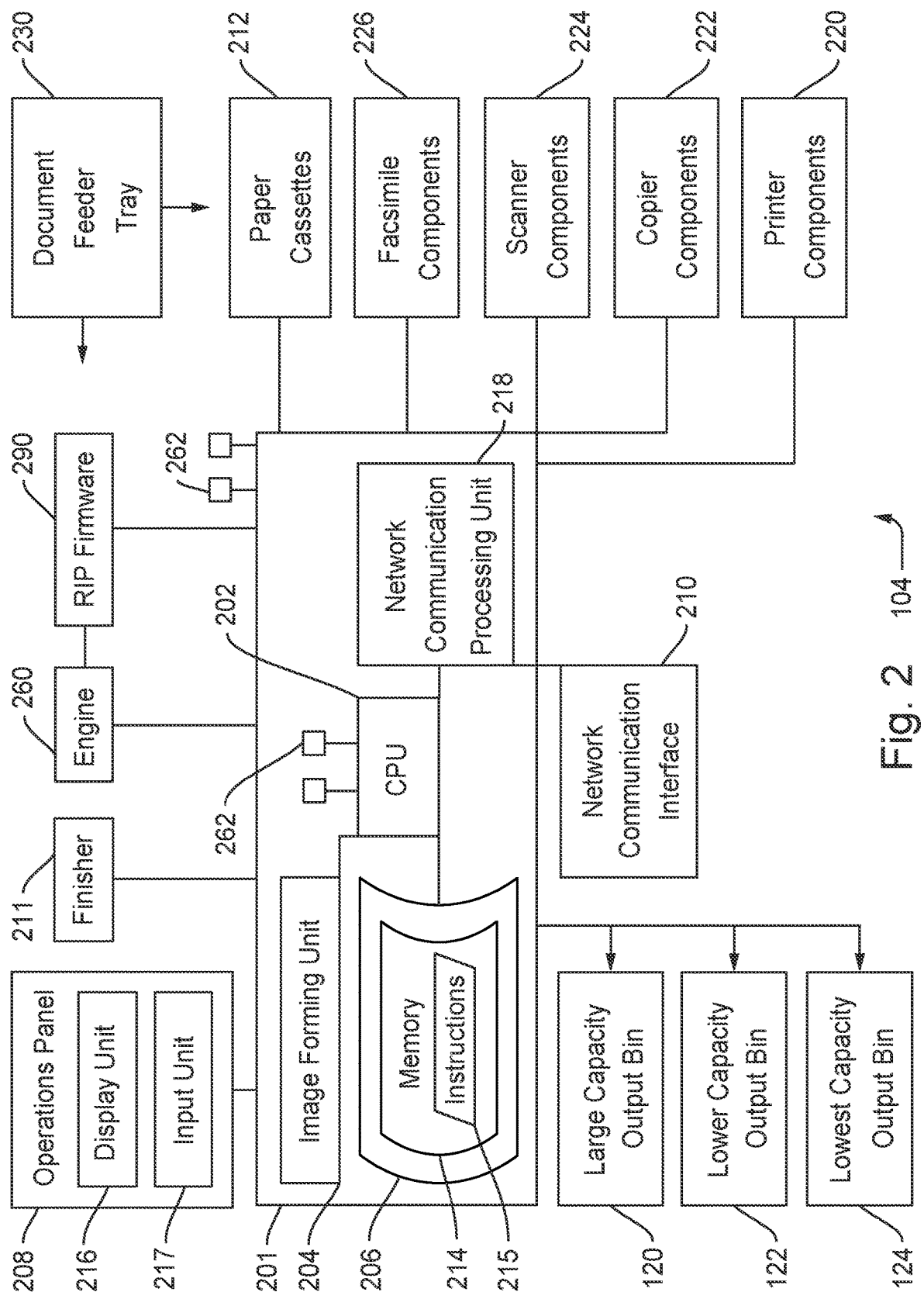
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110 and print management server 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray, such as tray 121, 123, or 125. Finisher 211 also may perform additional actions, such as sorting the finished papers, binding sheets of papers with staples, doubling, creasing, punching holes, folding, and the like. In some embodiments, finisher 211 may be within post-processing components 126.

Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within output bins 120, 122, and 124. Output bins 120, 122, and 124 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EE-PROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Memory unit 206 may include data storage 116, disclosed above.

Printing device 104 communicates with client device 110 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110.

Figure 3:
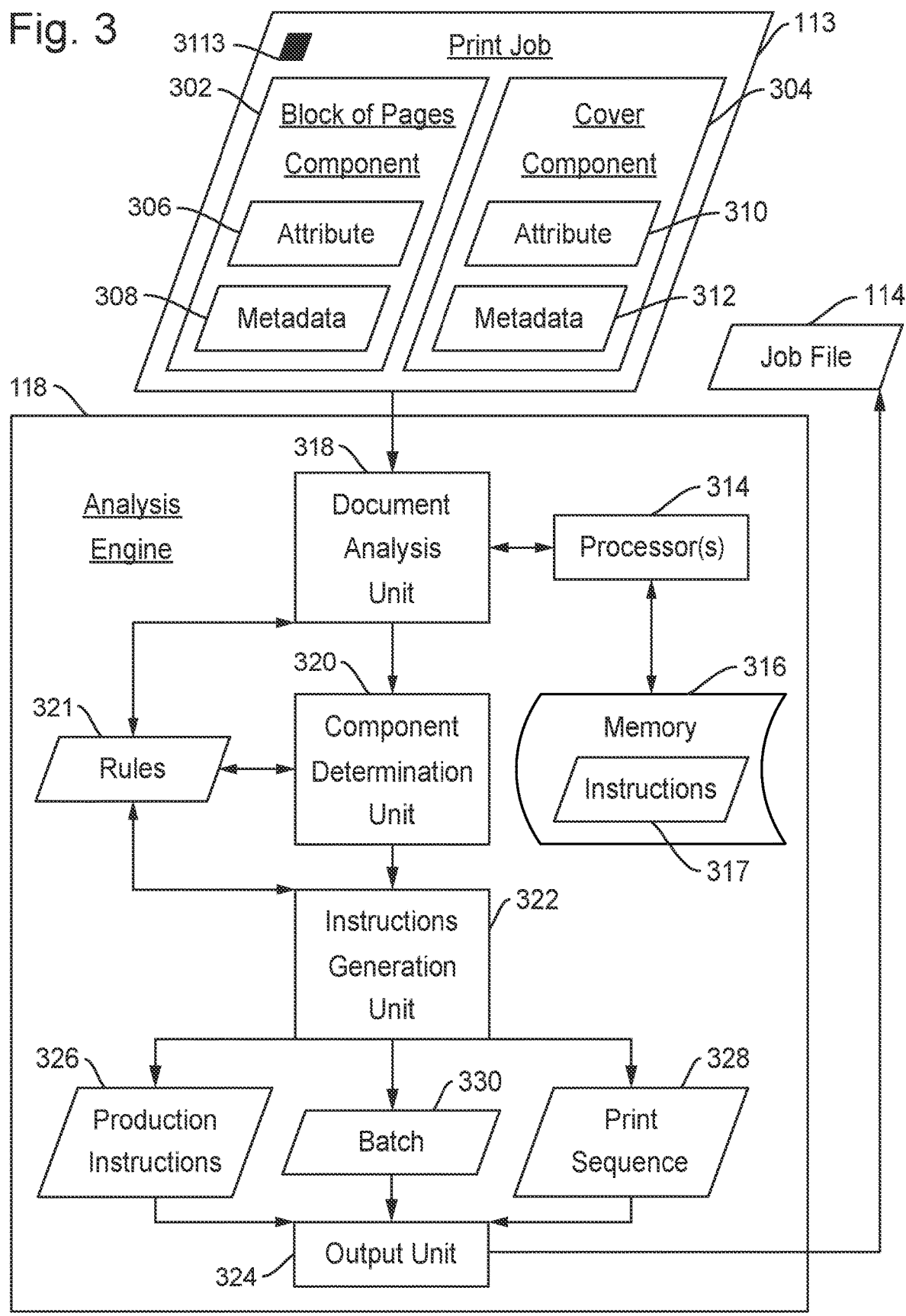
FIG. 3 illustrates a block diagram of a print job being analyzed by an analysis engine for printing operations according to the disclosed embodiments.

FIG. 3 depicts a block diagram of print job 113 being analyzed by analysis engine 118 for printing operations according to the disclosed embodiments. FIG. 3 may provide a flow diagram of the data as it is received at DFE 106 and then routed accordingly to be printed. Print management server 108 also may implement this flow diagram if printing operations are managed there.

Analysis engine 118 includes one or more processors 314 to enable the following components to perform various operations that allow the analysis engine to receive and process print job 113. Processor 314 accesses memory 316 to retrieve instructions 317 stored thereon. Instructions 317 configure processor 314 into analysis engine 118. In some embodiments, a processor 314 may be used for each unit disclosed below along with specific instructions 317 for the respective processor. Analysis engine 118 may be its own standalone device including processor 314 and memory 316 storing instructions 317. In other embodiments, analysis engine 118 may be implemented at print management server 108. In this instance, print management server 108 receives print job 113 to perform the disclosed analysis and processing.

Print job 113 is received at DFE 106, which may direct the print job to analysis engine 118. In some embodiments, print job 113 may include metadata, a flag, or other indicator 3113 that instructs DFE 106 to route the print job to analysis engine 118. This feature may avoid having every received print job at printing device 104 from undergoing the analysis and processing. Print job 113 may include two or more components that are identified within analysis engine 118 and then treated differently in the printing operations.

Print job 113 includes at least two components. For example, print job 113 may relate to a book having multiple components. Cover component 304 may include the data used to print covers for the books. Block of pages component 302 may include the data used to print the pages for the book. Additional components also may be included in print job 113, such as appendices, maps, inserts, and the like. Components within print job 113 may be printed separately and subject to different printing operations.

Each component may include data in addition to the data to be printed on the pages or covers of the book. For example, block of pages component 302 may include production attribute 306 and cover component 304 may include production attribute 310. A production attribute may set forth a set of dimensions for the components or the type of media to be used. More than one attribute may be defined. The dimensions and type of paper used to print block of pages component 302 differs from the dimensions and type of media used to print cover component 304.

Block of pages component 302 also includes metadata 308 and cover component 304 includes metadata 312. Metadata may correspond to additional information, such as print instructions, production instructions, finishing instructions, and the like. Metadata 308 and 312 also may identify the respective component. Metadata 308 and 312 also may include data needed to perform color printing for the respective component, such as tone reproduction curves or ICC profiles.

Analysis engine 118 uses the data from each component to determine the individual components as well as how to treat each component within printing device 104, or even system 100. Print job 113 may be initially received at document analysis unit 318. Document analysis unit 318 identifies multi-component print jobs. It may do so using rules 321 that specify how to identify components, such as identify an attribute or check the metadata for the component. Document analysis unit 318 also may identify the number of components in print job 113, but, in some embodiments, not necessarily the type of component. Thus, for print job 113, document analysis unit 318 may determine there are two components. It also may identify respective attributes and metadata associated with each component.

Each component is provided to component determination unit 320. Component determination unit 320 determines that type of data is within a component in order to identify it accordingly. For example, component determination unit 320 determines that cover component 304 includes data for the cover of the book. It may do this using a few different processes. Component determination unit 320 may use rules 321 that help identify the different components.

For example, a rule of rules 321 may instruct component determination unit 320 to consider the first page or two of any print job to be a cover component. When generating print job 113, print driver 130 may place the data for printing the cover, or cover component 304, in the first two "pages" for the document. Another rule may analyze the dimensions of the first two pages and consider these pages if their dimensions differ from the dimensions used for the rest of the pages. For example, attribute 310 may be the dimensions of the pages for that component of print job 113. These dimensions differ from the dimensions of the block of pages to be printed, or attribute 306. Thus, component determination unit 320 may determine that the larger dimensions for the pages as the attribute is cover component 304. This feature may be effective when the cover component is not in the first page or two of the print job.

Component determination unit 320 also may analyze metadata for pages in the print job to determine which component they belong. The metadata may include print instructions that identify a page as a cover page or a block page. Component determination unit 320 also may look at separate but correlated print jobs for similar information. It may access information about previous print jobs from DFE 106 and compare this information to print job 113 to determine cover component 304 and block of pages component 302.

Analysis engine 118 also is configured to determine the required print sequence and face orientation for each component. When jobs are submitted to DFE 106 for printing, their production instructions may include the print instructions as well as their finishing instructions. Thus, instructions generation unit 322 analyzes metadata or instructions provided with print job 113 to determine these instructions on how to print the different components.

For example, cover component 304 may go through the following steps: print, lamination, trimming, and perfect binding with the pages of block of pages component 302. Block of pages component 302 may go through printing, folding, and perfect binding with the cover. The instructions for each component identified above may be found in the metadata associated with each component. Instructions may be found in metadata 308 for block of pages component 302 and in metadata 312 for cover component 304. In other embodiments, these instructions may be separate data files tied to each component. For example, attribute 306 may relate to a series of production instructions for block of pages component 302 and attribute 310 to a different series of production instruction for cover component 304.

Instructions generation unit 322 may generate production instructions 326, print sequence instructions 328, and batch criteria 330 for each component. Production instructions 326 may include any print instructions and finishing instructions for the component. Print sequence instructions 328 may include post-print instructions that will be configured to have a specific effect on the printed stack of the component. Example effects may be reversing the print order or tumbling, so that face up becomes face down. In some embodiments, DFE 106 may include a list of the post-print processes that may be implemented at printing device 104 and referenced in print jobs. Analysis engine 118 determines these instructions. Batch criteria 330 is disclosed in greater detail below.

For example, print job 113 may include production instructions 326 for block of pages component 302 to print components 1 to n face down, which would result with downward facing blocks stacked from the first to the last, if block printing and folding are done inline. In order for the covers to have a matching sequence, cover component 304 should be printed as components n to 1 because the lamination will reverse the sequence and the trimming will not. Thus, production instructions 326 for cover component 304 should include these instructions. In some embodiments, instructions generation unit 322 can generate the production instructions for cover component 304 to match the production instructions provided for block of pages component 302. In alternate embodiments, the production instructions may be dictated by printing device 104 and how it prints covers and pages. Thus, DFE 106 may provide instructions to analysis engine 118 to generate the production instructions and print sequence for the components.

Analysis engine 118 also is configured with rules 321 that define job batching. When print jobs are received by DFE 106, it will aggregate them until the batch criteria is met. Thus, each component may be included in batch criteria 330. The batch criteria may be defined by one or more rules 321. For example, batching criteria 330 may include waiting until a certain number of impressions or books have been aggregated. Batching rules also may include options for releasing print jobs after a specified amount of time. In addition, batches should also have a production commonality, or common production attribute 306 or 310, to keep these common documents together when printing. For example, print jobs with cover components 304 that require lamination as attribute 310 are not batched with cover components 304 that do not require lamination as attribute 310.

In some embodiments, batching criteria 330 may not be defined by analysis engine 118 but within DFE 106. Rules 321 may be within DFE 106 and applied to all print jobs. This features also may be implemented in print management server 108 to control batching and printing as needed. Once DFE determines that a batch of books should be released, it will sub-divide the batches into production groups based on the batching criteria and rules, or, in some embodiments, output capacity.

Output unit 324 may form job file 114 to be provided to DFE 106 or placed in job queue 112 to await printing. Job file 114 includes the different components along with their associated production instructions, print sequence instructions, and any applicable batching criteria. Job file 114 corresponds to print job 113.

Figure 4:
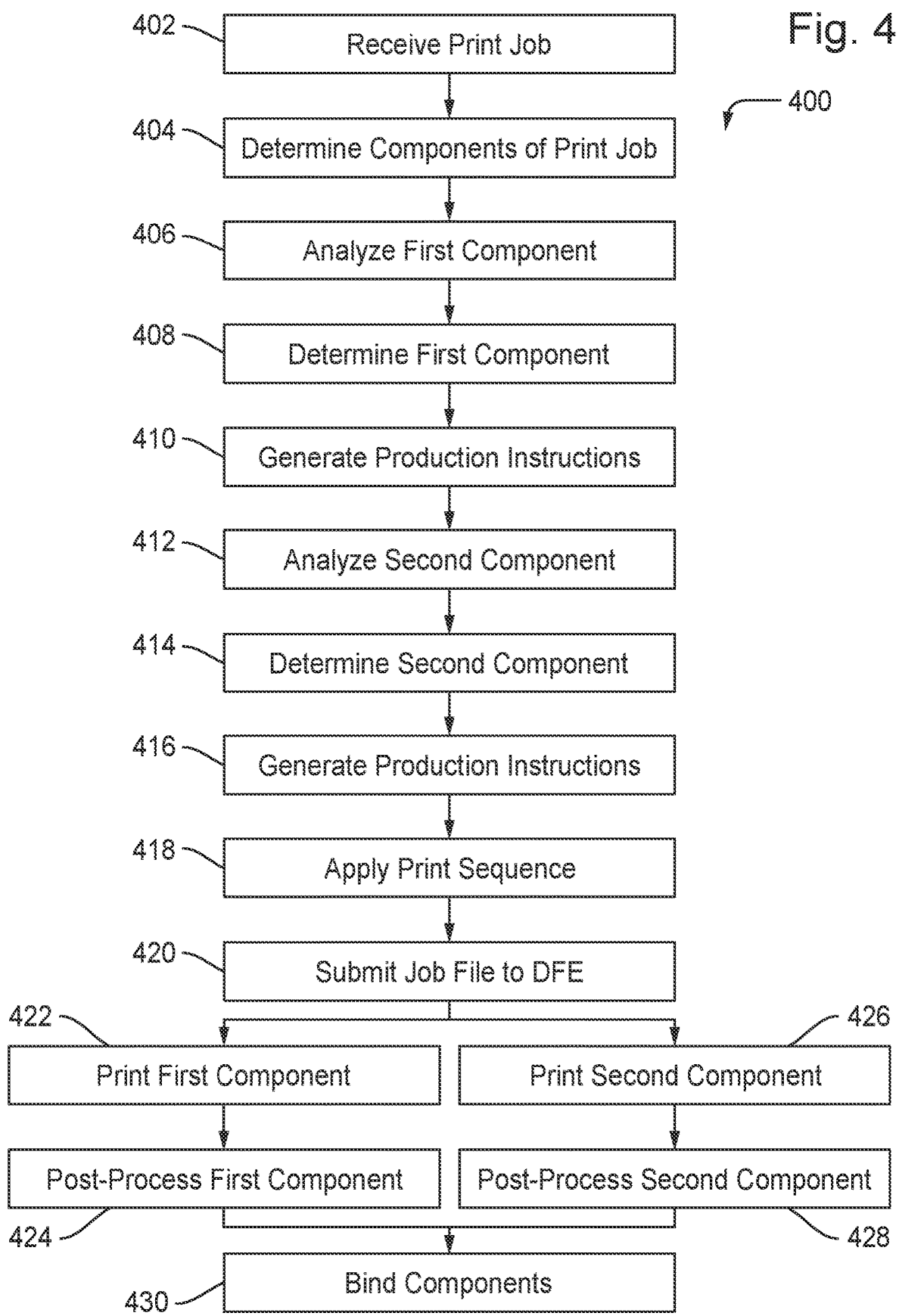
FIG. 4 illustrates a flowchart for processing the print job having a plurality of document components according to the disclosed embodiments.

FIG. 4 depicts a flowchart 400 for processing print job 113 having a plurality of document components according to the disclosed embodiments. Flowchart 400 may refer to FIGS. 1A-3 for illustrative purposes. Flowchart 400, however, is not limited to the embodiments disclosed by FIGS. 1A-3.

Step 402 executes by receiving print job 113 at DFE 106 of printing device 104. Print job 113 may be for a document, such as a book, that may be printed for many copies. In other words, printing device 104 may print multiple copies of the document. Print job 113 also may be received by print management server 108 then forwarded to printing device 104. In some embodiments, print job 113 may be placed in job queue 112 before any processing occurs. Thus, DFE 106 receives print job 113 then releases it when ready to print for processing, such as by analysis engine 118.

Step 404 executes by determining the components within print job 113. For example, document analysis unit 318 may determine there are two separate components within print job 113. As disclosed above, it may do this using data or information provided with print job 113. Attributes associated with each component may differ to show which pages belong to which component. Step 406 executes by analyzing a first component of print job 113. Referring to FIG. 3, a first component may be component 304.

Step 408 executes by determining the first component includes data for a cover of the document, shown as cover component 304. As disclosed above, rules 321, attribute 310, or metadata 312 for cover component 304 may indicate that the first component relates to the cover. Step 410 executes by generating production instructions 326 for the first component, or cover component 304, based on it being a cover of the document. As disclosed above, DFE 106 may provide these instructions or they may be found in the data associated with the component. Step 410 also may generate print sequence instructions 328.

Step 412 executes by analyzing a second component of print job 113. Referring to FIG. 3, a second component may be block of pages component 302. The second component differs from the first component, as shown by attribute 306 or metadata 308 for component 302. For example, attribute 306 may include a set of dimensions for the pages within block of pages component 302. Attribute 306 differs from attribute 310 for cover component 304 as it includes a different set of dimensions for printing the cover. Alternatively, attributes 306 and 310 may relate to the media used to print the pages for their respective components. The media used to print the cover differs from the pages within the book.

Step 414 executes by determining the second component includes data for the block of pages of the document, shown as block of pages component 302. As disclosed above, rules 321, attribute 306, or metadata 308 for block of pages component 302 may indicate that the second component relates to the pages in the book. Step 416 executes by generating production instructions 326 for the second component, or block of pages component 302, based on it being the pages of the document. As disclosed above, DFE 106 may provide these instructions or they may be found in the data associated with the component. Step 416 also may generate print sequence instructions 328 for block of pages component 302.

Step 418 executes by applying print sequences, as found in print sequence instructions 328, to the respective components. Step 418 may be where print sequence instructions 328 are generated, as opposed to steps 410 and 416. Thus, a first print sequence is applied to cover component 304 and a second print sequence is applied to block of pages component 302. These instructions also may include post-processing instructions for post-processing components 126 of printing device. Different sequences and instructions may be applied to different components, as disclosed above.

Step 420 executes by submitting job file 114 related to print job 113 to DFE 106 along with production instructions 326 and print sequence instructions 328 for each component. Step 422 executes by printing the first component, or cover component 304, according to the print instructions within production instructions 326 for this component. As disclosed above, these instructions may relate to the facing of the printed components within its respective output bin. Step 424 executes by post-processing the printed cover component according to any finishing instructions or print sequence instructions 328.

Step 426 executes by printing the second component, or block of pages component 302, according the print instructions within production instructions 326 for this component. As disclosed above, these instructions may relate to the facing of the printing pages for the book in its respective output bin or bins. Step 428 executes by post-processing the printed book pages component according to any finishing instructions or print sequence instructions 328. Step 430 executes by binding the printed components together to form the books, or documents, set forth by print job 113.

Figure 5:
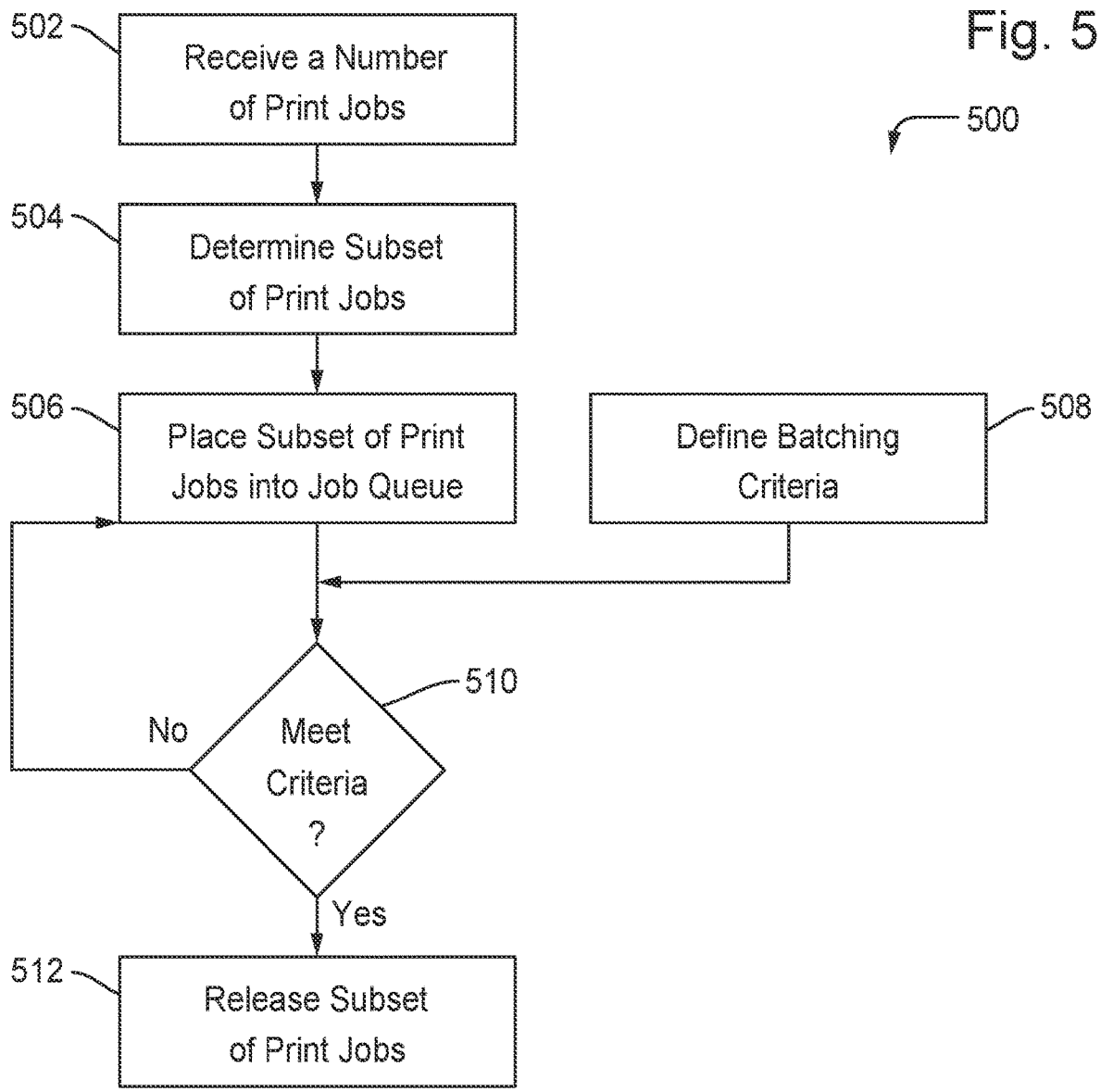
FIG. 5 illustrates a flowchart for printing a batch of components based on batching criteria according to the disclosed embodiments.

FIG. 5 depicts a flowchart 500 for printing a batch of components based on batching criteria 330 according to the disclosed embodiments. Flowchart 500 may refer to FIGS. 1A-4 for illustrative purposes. Flowchart 500, however, is not limited to the embodiments disclosed by FIGS. 1A-4. Flowchart 500 also may refer to FIG. 6, which depicts a flow diagram 600 of a subset of print jobs using batching criteria for printing operations according to the disclosed embodiments.

As disclosed above, DFE 106 may be configured with rules that define print job batching. For example, rules 321 may be made available to DFE 106 to provide batching rules. As print jobs are received by printing device 104, the print jobs are aggregated until a criteria in the batching rules are met. Once DFE 106 determines that a batch of print jobs, such as books, should be released, it may sub-divide the batches into production groups based on batching criteria, rules, or output capacity.

Step 502 executes by receiving a number of print jobs 113 at DFE 106 of printing device 104. Alternatively, a number of print jobs may be received at print management server 108. Preferably, the print jobs related to printing books include at least two components, such as a cover component 304 and a block of pages component 302.

Step 504 executes by determining a subset of print jobs from the number of print jobs received at DFE 106. The subset of print jobs includes a common production attribute. In other words, the print jobs in the subset include a common attribute 306 or 310. For example, referring to FIG. 6, number of print jobs 602 are received at DFE 106. A print job of the number of print jobs may include different components, much like print job 113 disclosed above. Within the number of print jobs, a subset of print jobs 606 may be identified as having a common production attribute 604.

For example, common production attribute 604 may be a common attribute 310 for cover components 304 within subset of print jobs 606. The common production attribute may be a lamination requirement for the cover of the book of the print job. Thus, attribute 310 for the cover components of subset of print jobs 606 all require lamination for their covers. Those print jobs of number of print jobs 602 that do not require lamination for their cover components are not included in subset of print jobs 606.

Step 506 executes by placing subset of print jobs 606 in job queue 112 of DFE 106. As print jobs having common production attribute 604 are received, they are placed in job queue 112. The print jobs of subset 606 are not released for printing. DFE 106 may count the total print jobs in subset 606 as they are placed in job queue 112. Step 508 executes by defining a batching criteria 330 for subset of print jobs 606. Batching criteria 330 may be defined by rules 321 within DFE 106, as disclosed above. For example, batching criteria 330 may specify that print jobs of subset 606 be aggregated until a certain number of print jobs have been received. Rules 321 also may provide an option to define a batching criteria 330 based on a specified amount of time such that print jobs of subset 606 are released after the time amount is met. Batching criteria 330 also may be defined by data 608 received with the print jobs or a component of the print jobs. Data 608 also may be provided by system 100 or print management server 108 as defined by an operator.

Figure 6:
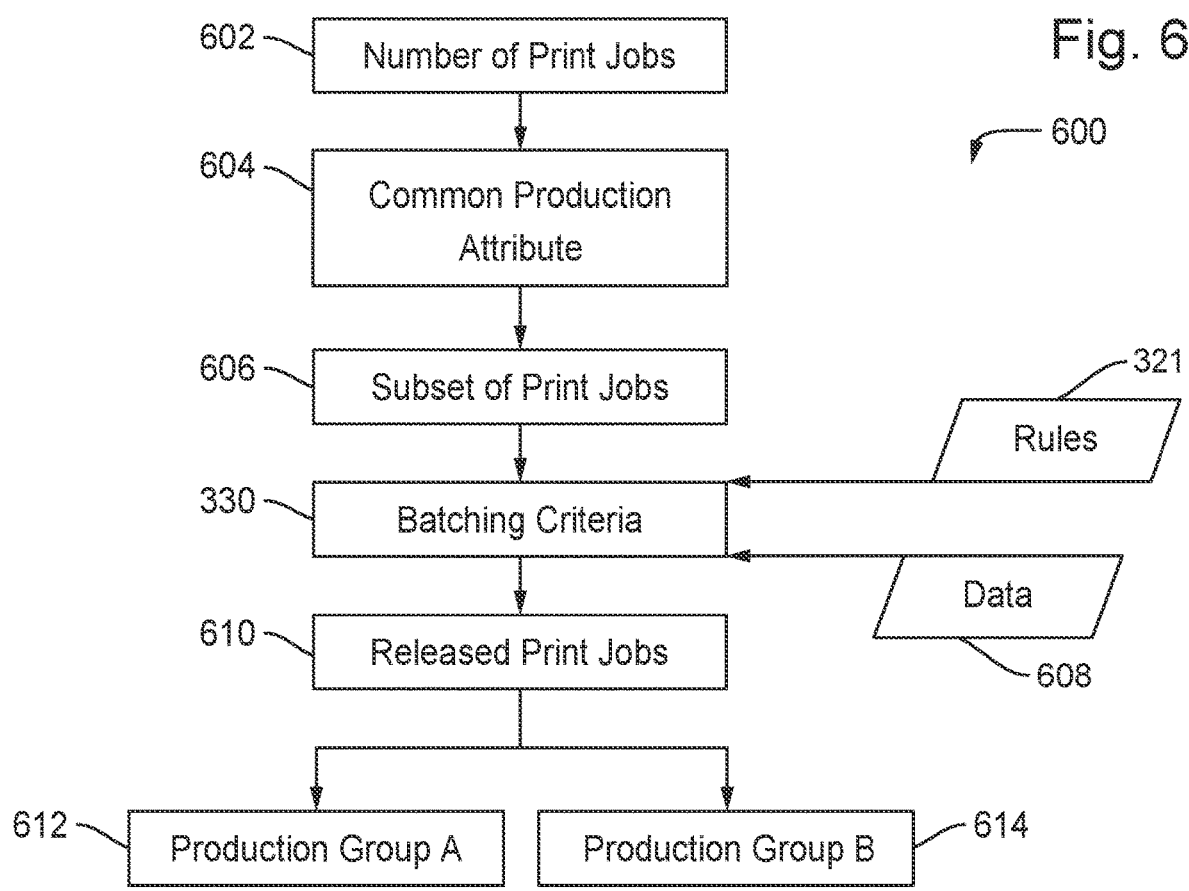
FIG. 6 illustrates a flow diagram of a subset of print jobs using batching criteria for printing operations according to the disclosed embodiments.

Step 510 executes by determining whether batching criteria 330 is met by the received print jobs of subset 606. Referring to FIG. 6, batching criteria 330 may be applied to subset 606 when a new print job is identified and placed in job queue 112. Alternatively, batching criteria 330 may be applied periodically or at specified times to assess the status of subset 606. As disclosed above, batching criteria 330 may be defined by a certain number of print jobs have been aggregated or a period of time has elapsed since the receipt of the initial print job in subset 606. If step 510 is no, then flowchart 500 returns to step 506 to keep receiving print jobs of subset 606.

If step 510 is yes, then step 512 executes by releasing subset of print jobs 606 in job queue 112 to be processed and printed at printing device 104. Thus, released print jobs 610 are provided for printing. Released print jobs 610 should still include common production attribute 604 for printing, sequencing, or finishing at least one of the components of the print jobs. These processes are disclosed in greater detail by FIG. 7 below.

Figure 7:
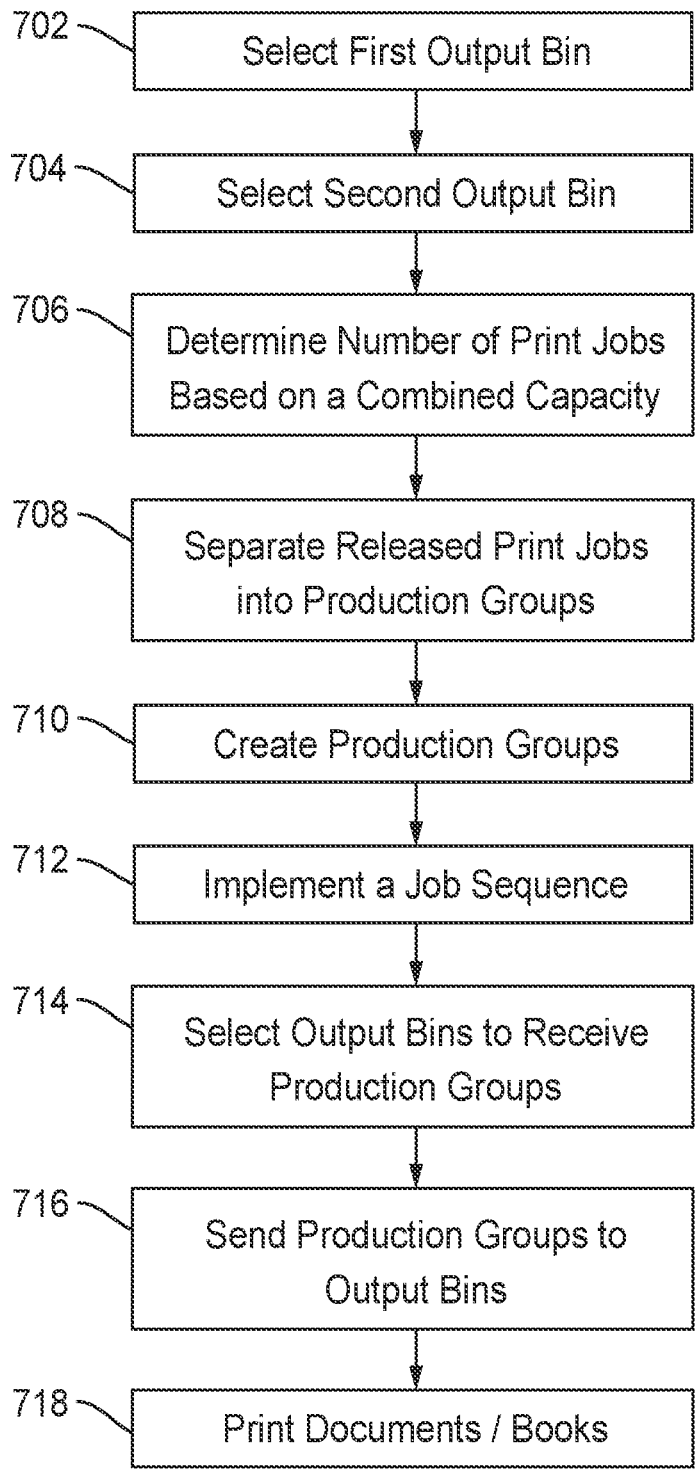
FIG. 7 illustrates a flowchart for printing the released batch of print jobs at the printing device according to the disclosed embodiments.

FIG. 7 depicts a flowchart 700 for printing the released batch of print jobs at printing device 104 according to the disclosed embodiments. Flowchart 700 may refer to FIGS. 1A-6 for illustrative purposes. Flowchart 700, however, is not limited to the embodiments disclosed by FIGS. 1A-6. For illustrative purposes, DFE 106 at printing device 104 may perform the steps disclosed below. Print management server 108, however, also may perform these steps according to the disclosed embodiments.

Step 702 executes by selecting a first output bin 120 at printing device 104. Output bin 120 has a capacity to print a component of released print jobs 610, such as block of pages component 302. Step 704 executes by selecting a second output bin 122 at printing device 104. Output bin 122 also has a capacity to print a component of released print jobs 610, such as cover component 304. The capacity for output bin 122 differs from the capacity for output bin 120. Step 706 executes by determining a number of print jobs that can be printed from released print jobs 610 based on the combined capacity of the capacities of output bins 120 and 122.

Step 708 executes by separating released print jobs 610 into production groups 612 and 614. DFE 106 may divide the batch of released print jobs into production groups based on several factors, including into production groups for each component. Thus, cover components 304 will be in one production group while block of pages components 302 may be in another. In other embodiments, production groups may be determined on common production attribute 604, or an additional production attribute that is common to each production group.

Step 710 executes by creating productions groups 612 and 614 based on the different components or different attribute. DFE 106 may create the production groups therein and track them differently throughout the printing process. Step 712 executes by implementing a job sequence within production groups 612 and 614 according to post-print processing instructions, preferably stored at DFE 106.

Step 714 executes by selecting the appropriate output bin to receive each production group. For example, production group 612 may relate to block of pages component 302. Output bin 120 is a higher capacity output bin that can accommodate a large number of pages. Thus, DFE 106 may select output bin 120 to receive production group 612. As a result, output bin 122 receives production group 614. Step 716 executes by sending production groups 612 and 614 to their respective selected output bins 120 and 122. Step 718 executes by printing the documents or books corresponding to the released print jobs at printing device 104.

Steps 702-718 may be illustrated in greater detail below. For example, DFE 106 may select two output bins 120 and 122 to print released print jobs 610. Output bin 120 may be a large capacity output bin. Output bin 122 may be a lower capacity output bin. Printing device 104 may include a main tray in a high capacity stacker (5000 sheet capacity) and a top tray (500 sheet capacity) in the stacker. DFE 106 may determine the number of print jobs that the combined capacity of output bins 120 and 122 can accommodate. Once the number of print jobs is determined, DFE 106 may separate cover components 304 and block of pages components 302 into their own production groups 612 and 614, respectively. The job sequence within production groups 612 and 614, the print direction (1 to n/n to 1), and face orientation (face up/face down) will be based on the required post-print processing for the print jobs in each group.

Once the production groups and any sub-production groups have been generated, DFE 106 will print them to the selected output bins. If the print jobs and components are separate, then DFE 106 may adjust the sequence of printing. If the print jobs are separate but the components are in the same file, then DFE 106 may print subsets of the file to different output bins. If the print jobs are all in one combined file, then DFE 106 may print subsets for each book or document in the file to different output bins. The print sequence may be done either on a book-by-book basis. Alternatively, it may be done on an all blocks of pages first and then all covers in order to optimize productivity.

Once output bins 120 and 122 have reached their combined capacity, DFE 106 may pause production until trays 121 and 123 are unloaded. This may occur when either the high capacity or the low capacity tray cannot accommodate another book or document in its entirety. If trays 121 and 123 are not unloaded, then DFE 106 may switch printing to another set of trays, such as tray 125 of output bin 124. This process may repeat itself until all production groups in the batch of released print jobs 610 are printed.

If additional print jobs appear while a batch is printing, then DFE 106 may add them to the batch as a separate production group. Each production group represents a matching and contiguous set of print job components that will be in a matched sequence once the components have gone through their individual post-print processes. The matched sequence will ensure that all components are in the expected sequence so that the individual components can be bound together. The production grouping disclosed above will make sure that each time output is removed from printing device 104, it contains a contiguous set of books or documents that can be finished without dependencies on output from previous or subsequent batches.

Figure 8:
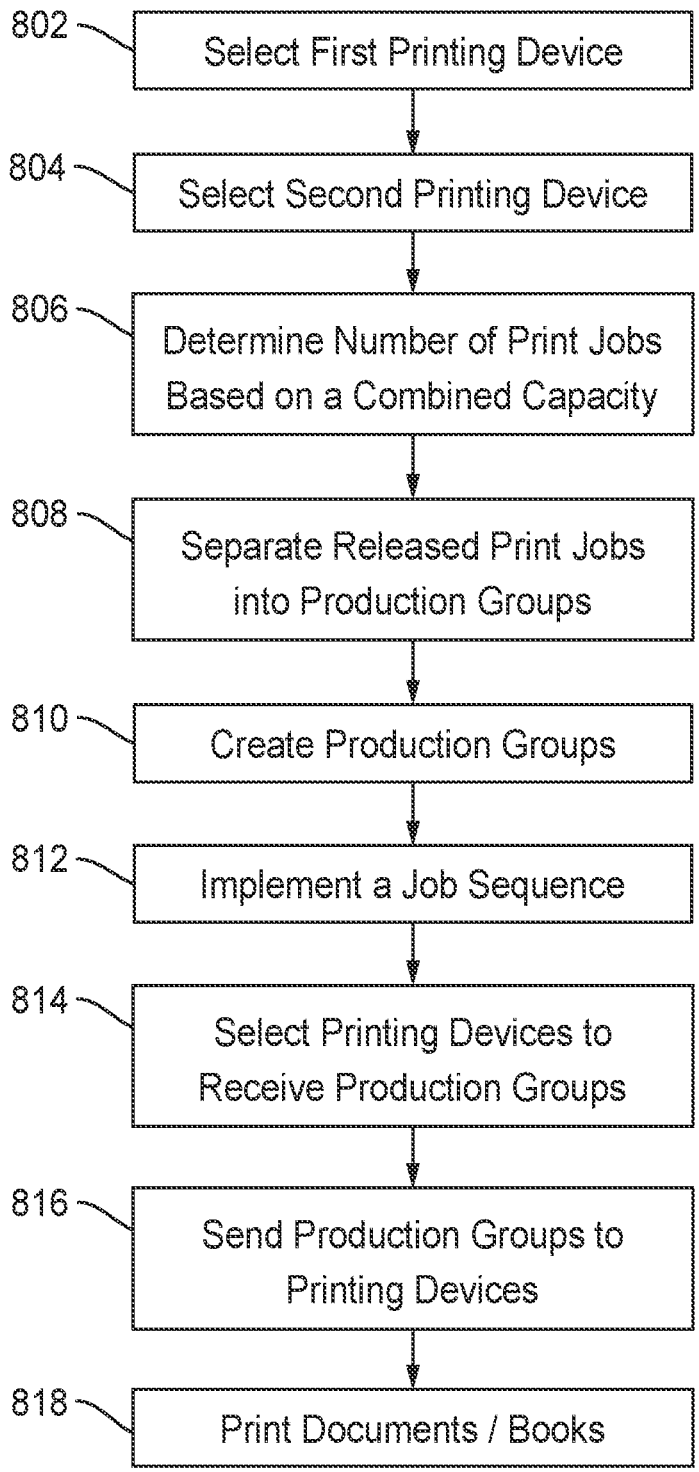
FIG. 8 illustrates a flowchart for printing the released batch of print jobs at printing devices within the printing system according to the disclosed embodiments.

FIG. 8 depicts a flowchart 800 for printing the released batch of print jobs at printing devices within printing system 100 according to the disclosed embodiments. Flowchart 800 may refer to FIGS. 1A-7 for illustrative purposes. Flowchart 800, however, is not limited to the embodiments disclosed by FIGS. 1A-7. Flowchart 800 may differ from flowchart 700 as that production groups are routed to other printing devices within printing system 100 as opposed to the output bins at printing device 104. For illustrative purposes, DFE 106 at printing device 104 may perform the steps disclosed below. Print management server 108, however, also may perform these steps according to the disclosed embodiments.

The disclosed embodiments may be implemented to work with multiple printing devices. One printing device may be used for each component or production group. The disclosed embodiments also may be configured to operate with multiple high capacity output bins, in single or multiple printing devices. System 100 would automatically add dividers to demarcate the production group boundaries for high capacity trays that are receiving covers or other components with low print volumes.

Step 802 executes by selecting a first printing device within system 100. Referring to FIG. 1C, system 100 also may include printing devices 150 and 160 in addition to printing device 104. As disclosed above, printing devices 150 and 160 includes their own output bins. In some embodiments, printing devices 150 and 160 have a higher capacity or different printing capabilities than printing device 104. Alternatively, it may just make sense to print the released print jobs or components using multiple printing devices. For example, output bin 152 of printing device 150 has a capacity to print a component of released print jobs 610, such as block of pages component 302.

Step 804 executes by selecting a second printing device within system 100, such as printing device 160. The second printing device allows for greater flexibility in printing documents as the different resources available throughout system 100 are made available for printing the different components. For example, a common production attribute 604 may not be available at printing devices 104 and 150 but at printing device 160. Output bin 162 of printing device 160 also has a capacity to print a component of released print jobs 610, such as cover component 304. The capacity for output bin 162 differs from the capacity for output bin 152.

Step 806 executes by determining a number of print jobs that can be printed from released print jobs 610 based on the combined capacity of the capacities of output bin 152 of printing device 150 and output bin 162 of printing device 160. The combined capacity between printing devices may be greater than the combined capacity available at a single printing device.

Step 808 executes by separating released print jobs 610 into production groups 612 and 614. DFE 106 may divide the batch of released print jobs into production groups based on several factors, including into production groups for each component. Thus, cover components 304 will be in one production group while block of pages components 302 may be in another. In other embodiments, production groups may be determined on common production attribute 604, or an additional production attribute that is common to each production group.

Step 810 executes by creating productions groups 612 and 614 based on the different components or different attribute. DFE 106 may create the production groups therein and track them differently throughout the printing process. Step 812 executes by implementing a job sequence within production groups 612 and 614 according to post-print processing instructions, preferably stored at DFE 106. DFE 106 may include the post-print processing capabilities of printing devices 150 and 160.

Step 814 executes by selecting the appropriate printing device to receive each production group. Selection may be based on the output bins at the respective printing device. For example, production group 612 may relate to block of pages component 302. Output bin 152 of printing device 150 is a higher capacity output bin that can accommodate a large number of pages. Thus, DFE 106 may select printing device 150 to receive production group 612. As a result, output bin 162 of printing device 160 receives production group 614. Step 816 executes by sending production groups 612 and 614 to their respective selected printing devices 150 and 160. Step 818 executes by printing the documents or books corresponding to the released print jobs at printing devices 150 and 160.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for printing a batch of print jobs, the method comprising:
    selecting a first output bin at a printing device based on a first production attribute of a first component of the print jobs, wherein the first output bin has a first capacity to print the first component of the print jobs;
    selecting a second output bin at the printing device based on a second production attribute of a second component of the print jobs, wherein the second output bin has a second capacity to print the second component of the print job, and wherein the second capacity differs from the first capacity of the first output bin;
    determining a number of print jobs of the batch of print jobs based on a combined capacity that the first capacity of the first output bin and the second capacity of the second output bin can accommodate;
    separating the first components from the second components of the number of print jobs;
    creating a first production group for the first component to be sent to the first output bin;
    creating a second production group for the second component to be sent to the second output bin; and
    printing the first production group to the first output bin and the second production group to the second output bin.

2. The method of claim 1, wherein the first output bin is a large capacity output bin.

3. The method of claim 2, wherein the first component of the print jobs relates to a block of pages for a book.

4. The method of claim 1, wherein the second output bin is a lower capacity output bin.

5. The method of claim 4, wherein the second component of the print jobs relates to a cover for a book.

6. The method of claim 1, further comprising adjusting a sequence of printing the first production group and the second production group at the printing device.

7. The method of claim 1, wherein the printing step includes printing the first production group at the first output bin prior to printing the second production group at the second output bin.

8. The method of claim 1, further comprising implementing a job sequence within the first production group and the second production group according to post-print processing instructions.

9. The method of claim 1, further comprising pausing printing of the first production group and the second production group based on the combined capacity.

10. A method for printing a batch of print jobs within a system of printing devices, the method comprising:
    selecting a first printing device within the system of printing devices based on a first production attribute of a first component of the print jobs, wherein the first printing device has a first capacity to print the first component of the print jobs;
    selecting a second printing device within the system of printing devices based on a second production attribute of a second component of the print jobs, wherein the second printing device has a second capacity to print the second component of the print job, and wherein the second capacity differs from the first capacity of the first printing device;
    determining a number of print jobs of the batch of print jobs based on a combined capacity that the first capacity of the first printing device and the second capacity of the second printing device can accommodate;
    separating the first components from the second components of the number of print jobs;
    creating a first production group for the first component to be printed according to a first set of production instructions;
    creating a second production group for the second component to be printed according to the second set of production instructions; and
    sending the first production group to the first printing device and the second production group to the second printing device.

11. The method of claim 10, further comprising
    printing the first production group of the first component of the print jobs at the first printing device; and
    printing the second production group of the second component of the print jobs at the second printing device.

12. The method of claim 11, further comprising printing the first production group before printing the second production group.

13. The method of claim 10, further comprising implementing a job sequence within the first production group and the second production group.

14. The method of claim 10, further comprising pausing printing of the first production group at the first printing device and the second production group at the second printing device based on the combined capacity.

15. The method of claim 10, wherein selecting the first printing device is based on an attribute of the first component of the print jobs.

16. The method of claim 10, wherein selecting the second printing device is based on an attribute of the second component of the print jobs.

17. A method for printing a batch of print jobs, the method comprising:

selecting a first output bin at a printing device based on at least one rule applicable to a first component of the print jobs, wherein the first output bin has a first capacity to print the first component of the print jobs;

selecting a second output bin at the printing device based on the at least one rule, wherein the second output bin has a second capacity to print a second component of the print job, and wherein the second capacity differs from the first capacity of the first output bin;

determining a number of print jobs of the batch of print jobs based on a combined capacity that the first capacity of the first output bin and the second capacity of the second output bin can accommodate;

separating the first components from the second components of the number of print jobs;

creating a first production group for the first component to be sent to the first output bin;

creating a second production group for the second component to be sent to the second output bin; and printing the first production group to the first output bin and the second production group to the second output bin.

\* \* \* \* \*